April 19, 1960
J. R. COSBY ET AL
2,932,972
PRESSURE-RESPONSIVE ELECTRICAL TRANSDUCER INCORPORATING
MEANS FOR CANCELLING EFFECTS OF VIBRATION, GRAVITY
AND ACCELERATION STRESSES
Filed Dec. 29, 1955
2 Sheets-Sheet 1
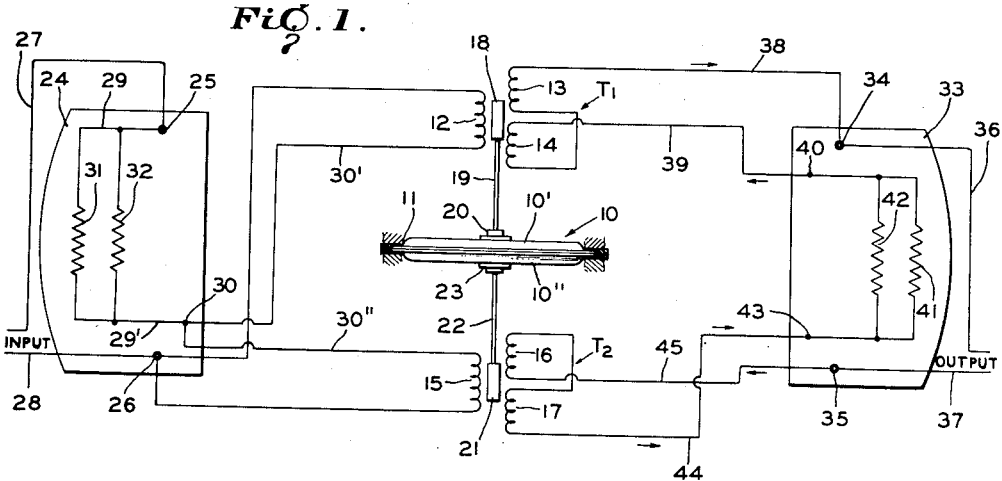
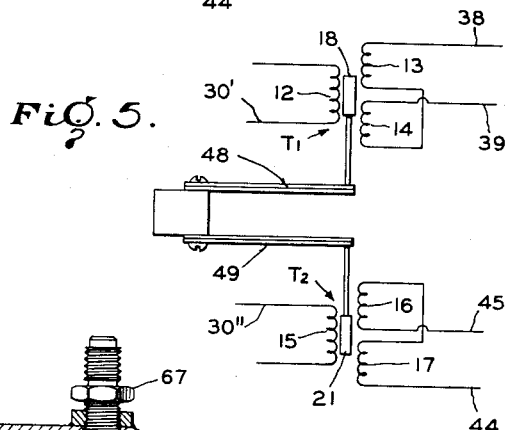
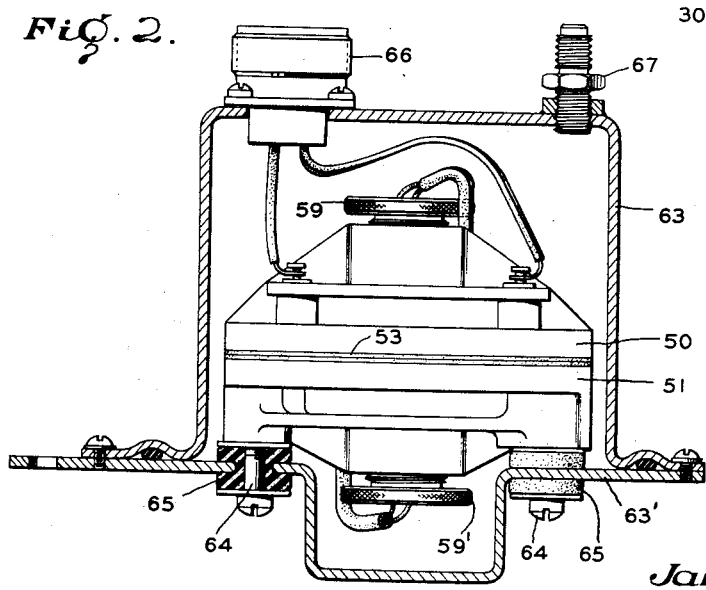
INVENTORS
James R. Cosby.
Rudolph J. Cerny.
BY K. G. Doub
ATTORNEY INVENTORS
James R. Cosby.
Rudolph J. Cerny.
BY K. G. Doub
ATTORNEY

United States Patent Office 2,932,972
Patented Apr. 19, 1960

2,932,972

PRESSURE-RESPONSIVE ELECTRICAL TRANSDUCER INCORPORATING MEANS FOR CANCELLING EFFECTS OF VIBRATION, GRAVITY AND ACCELERATION STRESSES

James R. Cosby and Rudolph J. Cerny, Baltimore, Md., assignors to Bendix Aviation Corporation, Baltimore, Md., a corporation of Delaware Application December 29, 1955, Serial No. 556,306

1 Claim. (Cl. 73—398)

This invention relates to devices of that type utilizing an element or elements to sense changes in a condition and convert such changes to electric energy, the amplitude of which constitutes a measure of such changes. Such devices are commonly known as transducers, and the sensing element may consist of an aneroid cell or diaphragm, a bimetal or the like adapted to respond to changes in pressure or temperature, while the electric circuit for the transducer may include a differential transformer having a movable magnetic core or armature in its primary which is operatively related to the aneroid cell or diaphragm so as to be displaced by the latter varying amounts with respect to a null or other predetermined position. Such types of pressure transducers may be used advantageously for various purposes, as for example a flight instrument to transmit intelligence or signals indicative of velocity, altitude, etc., or to operate a related system as when functioning as an altitude rate control for aircraft. In many installations, such for example as in a guided missile, the transducer must be able to respond with a high degree of accuracy under severe conditions of gravity, acceleration and vibration. Since the correct response of the transducer depends to a considerable extent on the sensitivity of the diaphragm or other sensing element, the latter is susceptible to flexing due to vibration, gravity and rapid acceleration stresses, in which event an electric response may be produced which sets up unwanted signals or voltage fluctuations in the electrical system. Although damping mechanism helps to lessen the effects of vibration, it may at the same time reduce the sensitivity of the diaphragm.

The primary object of the present invention, therefore, is to provide a transducer which will measure changes in a condition accurately under severe conditions of vibration, acceleration and like stresses.

Another and more specific object is to provide a pressure transducer in which any electrical response due to vibration or acceleration and gravity stresses will be automatically nullified in the transducer output circuit without affecting the sensitivity of response or the instantaneous signal output due to changes in pressure.

Another object is to provide a transducer which is highly sensitive to changes in pressure while at the same time being readily adjustable to operate according to a predetermined or preset schedule under severe conditions of vibration, acceleration and gravity stresses and extremes of temperature.

A further and more specific object is to provide a pressure transducer having in its electrical circuit a pair of differential transformers coordinated with an aneroid cell of a particular type in a manner such as to respond to signals created due to changes in pressure at varying altitudes while at the same time nullifying any electrical response due to vibration, acceleration and gravity stresses without affecting the output signal, the transformer coils being firmly held against axial and angular displacement yet readily adjustable for calibration and other purposes.

The foregoing and other objects and advantages will become apparent in view of the following description taken in conjunction with the drawings, wherein:

Figure 1 is a circuit diagram of a pressure transducer in accordance with the invention;

Figure 2 is a view in elevation of a physical embodiment of the transducer located in its housing, the latter being shown in section;

Figure 5 is a schematic diagram of a temperature-responsive transducer embodying the principles of the invention.

Figure 4:
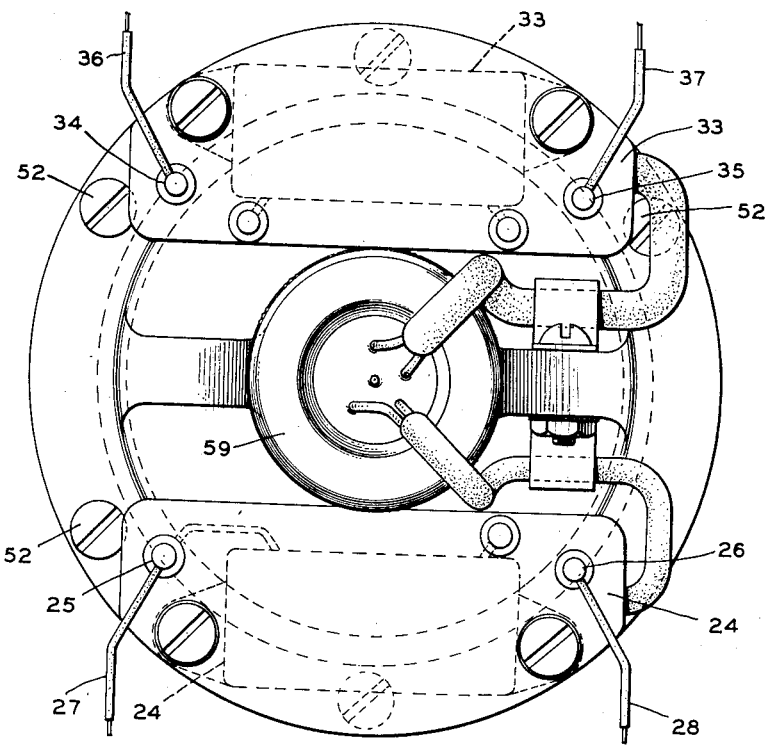
Figure 4 is a top plan view of Figure 3.

Referring to the diagrammatic version of the invention in Figure 1, an aneroid cell, generally indicated at 10, has upper and lower sections or halves in the form of thin reversely-dished shells 10' and 10'', joined at their meeting edges, defining an annular mounting flange 11. The cell is supported against axial displacement without "cramping" its response action in a manner to be explained in connection with the physical embodiment shown in Figures 2, 3 and 4. Such cells are sometimes termed "diaphragms" although each of the shells 10', 10'' is in effect a diaphragm. A pair of linear voltage differential transformers are operatively associated with the cell 10 on opposite sides of the latter, said transformers being generally indicated at $T_1$ and $T_2$. The transformer $T_1$ has a primary coil 12 and a pair of secondaries or pick-off coils 13 and 14; and the transformer $T_2$ has a similar primary 15 and associated secondaries or pick-off coils 16 and 17. In the example illustrated in Fig. 1 the primary coils are connected in phase and in parallel to a common source of supply; they have the same number of turns and are otherwise matched for like outputs at given current values. Transformer $T_1$ is provided with a movable magnetic core or armature 18, which is secured on the outer end of an armature shaft or stem 19, the opposite end of said stem being fixed to the shell 10' of the cell 10 as by a fitting 20; while the transformer $T_2$ is provided with a similar movable core or armature 21, carried on the outer end of a stem 22, the opposite end of which is fixed to the opposite shell 10'' of the diaphragm 10 by a fitting 23.

A small primary terminal board 24 is provided with terminals 25 and 26, and connected thereto are input conductors 27 and 28. From the terminal 25 the input circuit continues by way of wire 29 across parallel resistors 31 and 32 to wire 29' and thence to terminal 30. The resistor 31 is temperature responsive; it is preferably a thermistor having a predetermined negative temperature coefficient of resistance. The input is from a suitable source of A.C. supply, not shown, which should have a low harmonic frequency content in order to obtain a satisfactory null signal at the balance point of the pick-off coils 13, 14, 16 and 17. From the terminal 30, the input current is fed to the primary coils 12 and 15 by conductors 30' and 30''.

In the secondary system, a terminal board 33 has terminals 34 and 35, to which output or load conductors 36 and 37 are connected. The pick-off or secondary coils 13 and 14 of the transformer $T_1$ and the like coils 16 and 17 of the transformer $T_2$ have the same number of turns and impedance characteristics. The secondary coils of each transformer are connected in pairs in bucking or phase opposition, while at the same time the respective pairs of secondaries are connected in series to the load or output circuit in a manner such that when the voltage induced in the outer coils 13 and 17 or the inner coils 14 and 16 increases or decreases simultaneously, the voltages will add or aid one another and there will be a corresponding increase or decrease in the signal voltage impressed on the load circuit, but should there be a simultaneous increase or decrease in the induced voltage in the inner and outer coils 14 and 17 or the outer and inner coils 13 and 16, the voltage induced in the secondary circuit of one transformer will be offset by the voltage induced in the secondary circuit of the other transformer and thus the voltage in the output circuit will remain at the then existing value. This will be readily apparent if the circuit is traced from terminal 34 by way of wire 38, coils 13, 14 and wire 39 to terminal 40, then across parallel resistors 41 and 42 (the former being a thermistor) to terminal 43, and thence by way of wire 44, coils 17 and 16 and wire 45 to terminal 35.

As in the primary circuit, temperature compensation is provided in the secondary circuit by means of thermistor 41, which along with load resistor 42 is connected across the terminals 40 and 43.

*Operation*

Figure 3:
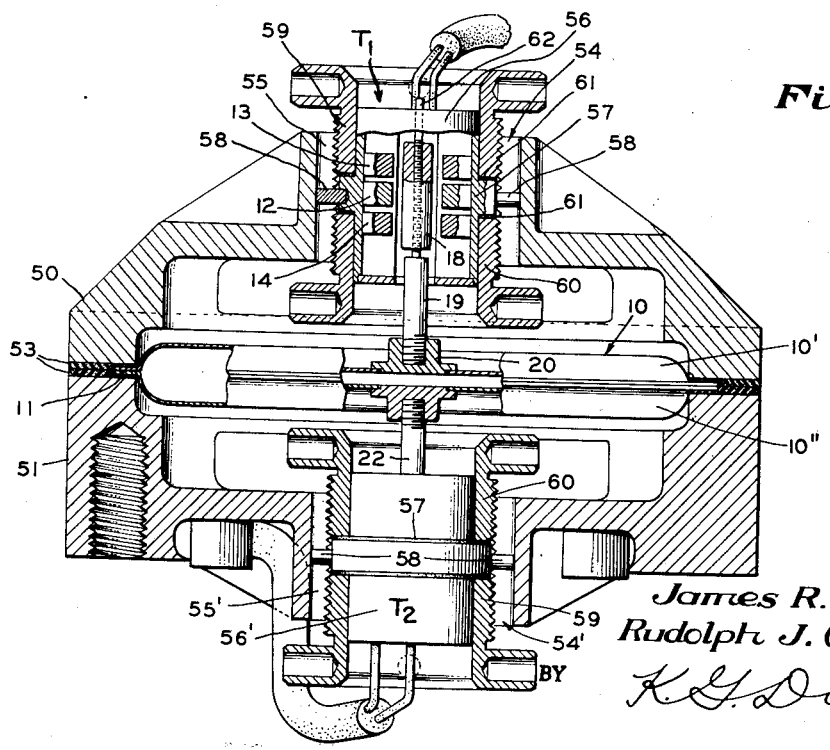
Figure 3 is a substantially central transverse vertical sectional view of the transducer of Figure 2 with certain of the parts shown in elevation.

Before describing the physical embodiment shown in Figures 3 and 4, a brief description of operation follows:

As heretofore noted, the primaries 12 and 15 of the transformers $T_1$ and $T_2$ are connected in phase and in parallel to a common source of supply. The secondaries of each individual transformer are connected in phase opposition or bucking relation to one another while at the same time the respective pairs of secondaries are connected in series with one another and the output or load circuit. As a result, the outputs of the pick-off coils or secondaries will add algebraically to carry out their intended functions. For example, let it be assumed that in the position of the parts in Fig. 1, the transducer is at sea level and the armatures or magnetic cores 18 and 21 are at a null point with respect to the transformers $T_1$ and $T_2$. As altitude is gained and the pressure decreases, the walls 10' and 10" of the diaphragm 10 will expand or move outwardly as will also the armatures 18 and 21. When this happens, the voltage induced in coils 13 and 17 increases while the voltage induced in coils 14 and 16 decreases. Assuming an instantaneous condition of a sine wave, there will be a flow of current in the direction of the arrows along the conductors 38, 44 and 39, 45. As a result, there will be a signal generated in the output circuit of the transducer indicative of the change of altitude; and as altitude is gained and the cores 18 and 21 move further outwardly, the signal voltage will increase up to the maximum capacity of the instrument.

Under certain conditions, it may be desirable to select a null point at an altitude other than sea level, in which case the differential or pick-off coils 13 and 14 and 16 and 17 may be adjusted relatively to the armatures 18 and 21 in a manner to be explained in connection with Figs. 2, 3 and 4.

Should the transducer be subject to vibrational or high acceleration and gravity stresses, then the diaphragm walls 10' and 10" will move in the same direction and at substantially the same rate. That such action occurs with a cell or diaphragm of the type herein illustrated has been demonstrated, first in laboratory experiments and later in actual practice. If it is assumed that the instantaneous direction of movement is downwardly as viewed in Fig. 1, the armatures 18 and 21 will also move downwardly in unison, whereupon the voltage induced in coil 14 will increase and that induced in 13 will decrease while at the same time the voltage induced in coil 17 will increase and that induced in 16 will decrease. If we assume that the parts are in the null position (although it could occur at any given altitude or position of the armatures 18 and 21) then the decrease in the flow of current in the output circuit of $T_1$ will be offset by a corresponding increase in the flow of current in the output of $T_2$, and the circuit will remain stable, i.e., there will be no output signal if we assume the foregoing condition occurs at null. However, should the vibrational, gravity or acceleration deflections occur at any position other than at null point and the transducer is sending out a signal, then the signal voltage will remain stable, i.e., there will be no increase or decrease in the then existing signal voltage.

It is not necessary that the transformers $T_1$ and $T_2$ be wired in the particular manner shown in order to have them coact to perform their normal or usual function while at the same time nullifying voltages induced in the secondaries due to vibrational and analogous stresses. For example, the primaries could be connected in series, and if they have the same number of turns and are otherwise matched for like output characteristics, the circuit will operate satisfactorily.

Fig. 5 illustrates an adaptation of the circuit of Fig. 1 to a temperature-responsive transducer. In this instance, the only change in structure is that the diaphragm 10 has been replaced by a pair of bi-metal elements 48 and 49, which are arranged to respond to changes in temperatures in reverse directions. However, should the transduce be subjected to extremely rapid acceleration, gravity or vibrational stresses, the bimetal stips, and hence the armatures carried thereby, will move in unison in the same direction.

In installations where the internal resistance of the coil structure must be kept within strict limits, it may be desirable to compensate for changes in temperature, particularly at high altitudes. That is the function of the thermistors 31 and 41. At extremely low ambient temperatures, the resistance of the winding of the transformer coils may change in value to a point where the predetermined or precalibrated characteristics of the circuit are thrown out of line. The thermistors are carefully matched with the coil resistance over a given temperature range, so that as the temperature decreases and the resistance of the coils also decreases, the resistance of the thermistors will proportionally increase and maintain the internal resistance of the circuit within a predetermined range. Since a thermistor is affected by self-heating due to current flow, it is necessary that this factor be taken into consideration in selecting a thermistor for a given circuit. The fixed resistors 32 and 42 are provided to maintain the required value of load resistance.

*Physical embodiment of Figures 2, 3 and 4*

Parts which are shown in diagrammatic form in Fig. 1 are given like reference numerals in Figs. 2, 3 and 4. The cell 10 and associated transformer coil assemblies are supported by a housing made up of a pair of sections 50 and 51, which are of open construction to reduce the weight of the device, the peripheral flange 11 of the cell 10 being engaged between the mating peripheral portions of said sections, which are secured by screws 52. The housing sections do not actually engage the mounting flange 11, the latter being clamped between recessed portions of a pair of spacer rings 53, which are of resilient material to permit the cell to function freely without cramping. The central portions of the housing sections are formed with aligned openings 54, 54', having axially extending slots 55, 55' to adjustably receive and retain the coil forms 56, 56'. Each coil form is in the shape of a cylindrical body provided with opposite end plates. An annulus or collar 57 is formed on the periphery of the coil cylinder or housing, and a pair of spline pins 58 project therefrom at diametrically opposite points and ride in the slots 55, 55'. A pair of externally-threaded adjustable coil-supporting nuts 59 and 60 are threaded into each opening 54, 54' of the housing sections and clampingly engage therebetween the collar 57 of the coil form cylinder associated therewith. Preferably a pair of antifriction washers 61 are interposed between the clamping edges of said nuts and said collar to prevent binding during adjustment.

The magnetic cores or armatures 18 and 21 are adjustably threaded on the outer ends of the armature pins 19 and 22, and each has a reduced guide portion 62 projecting from the outer end thereof through an opening formed in the adjacent end plate of the coil housing.

In order to adjust the coil forms in an axial direction, it is only necessary to adjust the nuts 59, 60, and since the spline pins 58 are engaged in splineways, the coil form is held against angular or rotational displacement.

Figure 2 shows the pressure transducer mounted in a housing 63 having a supporting base 63', the lower section 51 of the transducer being secured to said base by means of screw studs 64 projecting through cushioning grommets 65. The member indicated at 66 is an electrical receptor or plug-in connection for the electrical leads. The threaded nipple 67 at the upper right-hand corner of the housing is to accommodate a static pressure tube or line, not shown, which is adapted for connection to the static line of a velocity measuring and indicating system with which an aircraft is normally equipped. Instead of accommodating a static pressure line, the nipple 67 could serve as a vent passage to communicate the housing with any appropriate or desired pressure. Also, in certain installations, a housing may not be necessary.

The improved pressure transducer can be made extremely small and compact and light in weight, and experience has demonstrated its ability to withstand extreme vibration and shock stresses without disturbing its proper functioning. As will be obvious, no damping mechanism is necessary since the output or pick-off coils respond only to signals derived from changes in pressure on the cell 10.

It will be understood that certain limited changes in construction and design of the transducer as illustrated and described herein may be made to adapt the same to different installations and for different uses within the scope of the invention as defined by the appended claim.

What is claimed and desired to be secured by United States Letters Patent is:

In a pressure transducer, an aneroid cell comprising a pair of opposed flexible diaphragms which flex towards and away from one another in response to changes in pressure and in unison and in the same direction when subjected to vibrational, gravity and acceleration stresses, a pair of linear voltage differential transformers located on opposite sides of said cell each transformer having a primary coil and a pair of secondary coils arranged in substantially axial alignment with the central portion of its coacting diaphragm, each transformer also having a movable magnetic core or armature directly connected to its coacting diaphragm, said primary coils being connected to a common source of supply and matched for like output characteristics, the secondary coils of each transformer being connected in phase-opposition or bucking relation one to the other and the respective pairs of secondary coils being connected in series with one another in a signal output circuit in such manner that the phase relation of the output voltages of the transformers will cause any increase or decrease in the output voltage of one transformer to be nullified by a corresponding decrease or increase in the output voltage of the other transformer when the cores or armatures move in unison in the same direction and will cause the output voltages to be added to produce a signal voltage when the said cores or armatures move in opposite directions.

References Cited in the file of this patent

UNITED STATES PATENTS

| | | |
|---|---|---|
| 2,332,073 | Grierson | Oct. 19, 1943 |
| 2,593,169 | Moore | Apr. 15, 1952 |
| 2,627,183 | Greenwood et al. | Feb. 3, 1953 |
| 2,657,350 | Rossire | Oct. 27, 1953 |
| 2,737,624 | Muller | Mar. 6, 1956 |

FOREIGN PATENTS

| | | |
|---|---|---|
| 1,059,647 | France | Mar. 26, 1954 |